United States Patent Office 2,830,980
Patented Apr. 15, 1958

2,830,980

COMPLEX CHROMIUM COMPOUNDS OF METALLISABLE MONOAZO DYESTUFFS

Hans Ackermann, Riehen, near Basel, and Guido Schetty, Basel, Switzerland, assignors to J. R. Geigy A.-G., Basel, Switzerland, a Swiss firm No Drawing. Application September 6, 1955
Serial No. 532,775

Claims priority, application Switzerland July 20, 1953

4 Claims. (Cl. 260—147)

The present invention concerns a process for the production of new metallisable monoazo dyestuffs which contain no acid water solubilising groups. It also concerns the production of dyestuffs containing chromium bound in complex linkage which are suitable for the fast dyeing of natural and synthetic polypeptide fibres from a neutral to weakly acid bath, by treatment of the new monoazo dyestuffs with agents yielding chromium. Finally it is concerned with the production of fast dyed polypeptide fibres with the aid of the new chromium containing dyestuffs.

The present application is a continuation-in-part of copending application Serial No. 443,962, filed July 16, 1954 (now abandoned).

It has been found that new metallisable monoazo dyestuffs and the complex heavy metal compounds thereof are obtained if diazoxides of the general formula:

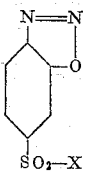

wherein X represents a methyl, ethyl or a chloromethyl group and the benzene ring can be further substituted nonionogenically, are coupled with 1-phenyl-3-methyl-5-pyrazolone compounds containing acid water solubilising groups. The monoazo dyestuffs obtained may then be reacted with agents yielding chromium in such amounts and under such conditions that at least one chromium metal atom is bound in complex linkage with two dyestuff molecules. If desired, the metallising can be performed in a mixture with another metallisable monoazo dyestuff which contains no acid water solubilising groups.

Diazoxides usable according to the present invention are obtained by diazotising 5-alkylsulphonyl-2-amino-1-hydroxybenzenes. These compounds are new and can be obtained, for example from the corresponding 4-alkylsulphonyl benzene-1-diazonium compounds by reacting them with hydroxylamino sulphonic acid to form the corresponding 4-alkyl sulphonyl-1-azidobenzene compounds and then rearranging them in concentrated sulphuric acid. Much more easily accessible technically however, are such diazoxides obtained from 4-alkylsulphonyl-2-nitrobenzene-1-diazonium compounds which, on neutralising the mineral acid of the diazotisation agent advantageously in the presence of naphthalene sulphonic acids while replacing the nitro group by the hydroxyl group, are converted in good yield into the corresponding diazoxides. Halogen or alkyl groups, in particular Cl and $CH_3$ can be named as further non-ionogenic substituents of the benzene ring.

As azo components usable according to the present invention only those 1-phenyl-3-methyl-5-pyrazolones can be used which contain no acid water solubilising groups such as sulphonic acid or carboxyl groups. These may contain for example halogen, alkyl, alkoxy or nitro groups as non-ionogenic substituents.

The coupling is often advantageously performed in the presence of organic solvents or solubility promoters as which for example can be named pyridine bases, soap, tetralinsulphonic acid or the alkali salts thereof and similar capillary active wetting and dispersing agents.

The hydroxides and, advantageously, the salts of chromium can be used as agents yielding chromium. In the metallising process it is advantageous to use the salts of weak, for example, organic acids, e. g. the acetates, or it can be performed in the presence of agents such as alkali acetates which neutralise the mineral acid. It is also often of advantage to use the complex salts, for example, the alkali or ammonium salts of chromosalicyclic acid. The agents yielding chromium are used in such amounts that there is at least one chromium atom to two dyestuff molecules, whilst an excess is not detrimental and often advantageous provided that the medium does not become acid. The metallisation is performed by heating the dyestuffs in aqueous or organic solution or suspension with aqueous solutions of the chromium salts, either open under reflux or in a closed vessel under pressure. As organic solvents preferably those are used which mix with water or are partially soluble therein, e. g. low alcohols, ether alcohols such as ethylene glycol monoether, dialkyl ketones, carboxylic acid amides such as formamide or acetamide. It is often advantageous either before or after isolation to treat the complex chromium compounds produced in an acid medium which are to be used as textile dyestuffs with alkaline agents such as alkali hydroxides or carbonates. In this case it is often advisable to mix the isolated chromium containing dyestuffs with slight amounts of salts having an alkaline reaction such as alkali carbonates, trisodium phosphate, alkali polyphosphates, alkali borates and, if necessary, also with anion active wetting and dispersing agents.

The complex chromium compounds are particularly valuable as textile dyestuffs and are suitable for the fast dyeing of natural and synthetic polypeptide fibres from a neutral to weakly acid bath. They correspond to the type $(F_1-M_1-F_2)M_2$. In this formula $F_1$ and $F_2$ each represent a monoazo dyestuff according to the invention, $M_1$ represents a chromium atom bound in complex linkage and $M_2$ represents an alkali metal or the ammonium cation. The two monoazo dyestuffs $F_1$ and $F_2$ can be the same or different, i. e. either symmetrical or mixed chromium complex compounds can be produced according to the monoazo dyestuffs used. If desired however, also the mixture of a monoazo dyestuff according to this invention and another metallisable monoazo dyestuff containing no acid water solubilising groups which advantageously may contain substituents having a favourable effect on the water solubility, such as sulphonic acid amide or alkyl sulphone groups, can be metallised with agents yielding chromium under the conditions described above to produce valuable new textile dyestuffs. A method for performing the process for the production of mixed chromium compounds which is of particular advantage technically consists in either coupling one diazo component with the mixture of two different coupling components, or coupling the mixture of two different diazo components with the same azo component and then metallising the dyestuff mixtures obtained. The new chromium containing dyestuffs are distinguished from the known comparable chromium containing monoazo dyestuffs which contain a low molecular and, if desired, chloro-substituted alkyl sulphone groups in another position of the diazo component and contain no acid water solubilising groups, by a bathochromic shifting of the shade. In many cases they increase and enrich this so valuable range of dyestuffs for the fast dyeing of wool, nylon and Perlon.

The following examples illustrate the invention without limiting it in any way. Where not otherwise stated, parts are given as parts by weight and the temperatures are in degrees centigrade. The relationship of parts by weight to parts by volume is as that of kilogrammes to litres.

EXAMPLE 1

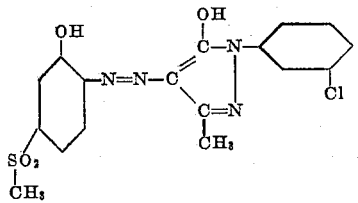

The neutralised paste of 19.8 parts of the diazoxide of 2-amino-1-hydroxybenzene-5-methyl sulphone is poured into a solution of 22 parts of 1-(3'-chlorophenyl)-3-methyl-5-pyrazolone and 4.3 parts of sodium hydroxide in 600 parts of water which has been cooled to 2°. The whole is stirred at 0–3° until the coupling is complete, whereupon the temperature is raised to 80°, sodium chloride is added and the dyestuff is filtered off hot. The dyestuff is pasted in 750 parts of water, 200 parts of a solution of ammonium chromosalicylate (corresponding to 7.6 parts of chromic oxide) are added and the whole is boiled under reflux while stirring until the formation of the complex is complete. After cooling, the chromium containing dyestuff which has precipitated is filtered off. After drying, it is a brown powder which dissolves in water with a red colour and dyes wool from a neutral to weakly acid bath in scarlet red shades which have very good fastness to light, washing and milling.

If the 22 parts of 1-(3'-chlorophenyl)-3-methyl-5-pyrazolone are replaced by the same number of parts of 1-(4'-chlorophenyl)-3-methyl-5-pyrazolone or 19.8 parts of 1-(4'-methylphenyl)-3-methyl-5-pyrazolone, dyestuffs having similar properties are obtained.

If instead of 1-(3'-chlorophenyl)-3-methyl-5-pyrazolone, 18.3 parts of 1-phenyl-3-methyl-5-pyrazolone or 22 parts of 1-(2'-chlorophenyl)-3-methyl-5-pyrazolone are used, then a dyestuff is obtained which has a somewhat less good drawing power from a neutral bath.

EXAMPLE 2

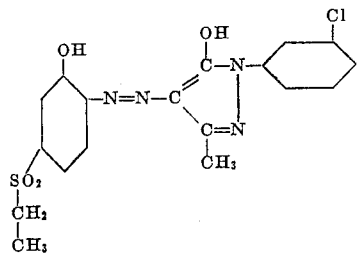

21.2 parts of the diazoxide of 2-amino-1-hydroxybenzene-5-ethyl sulphone are coupled with 22 parts of 1-(3'-chlorophenyl)-3-methyl-5-pyrazolone as described in Example 1. The monoazo dyestuff is filtered off, pasted in 750 parts of water and 200 parts of a solution of ammonium chromosalicylate (corresponding to 7.6 parts of chromic oxide) are added. The whole is heated under reflux until all of the dyestuff is bound in complex linkage. The chromation mixture is poured on to sodium chloride solution and ice and the dyestuff is filtered off. It dyes wool from a neutral or weakly acid bath in very fast scarlet red shades.

A dyestuff with a somewhat less good drawing power is obtained if instead of 22 parts of 1-(3'-chlorophenyl)-3-methyl-5-pyrazolone, 18.3 parts of 1-phenyl-3-methyl-5-pyrazolone are used as coupling component.

EXAMPLE 3

21.4 parts of the sodium salt of the dyestuff obtained according to Example 1 from the diazoxide of 2-amino-1-hydroxybenzene-5-methyl sulphone and 1-(3'-chlorophenyl)-3-methyl-5-pyrazolone and 22.1 parts of the sodium salt of the dyestuff according to Example 2 from the diazoxide 2-amino-1-hydroxybenzene-5-ethyl sulphone and 1-(3'-chlorophenyl)-3-methyl-5-pyrazolone are pasted in 750 parts of water. 200 parts of a solution of ammonium chromosalicylate (corresponding to 7.6 parts of chromic oxide) are added. The whole is heated under reflux until no more dihydroxyazo dyestuff can be traced and then the chromium containing dyestuff is filtered off. It dyes wool from a neutral to weakly acid bath in red shades which have very good fastness to washing, milling and light.

A similar dyestuff is obtained if instead of the coupling product from the diazoxide of 2-amino-1-hydroxybenzene-5-ethyl sulphone and 1-(3'-chlorophenyl)-3-methyl-5-pyrazolone, 20.4 parts of the sodium salt of the dyestuff from diazotised 2-amino-1-hydroxybenzene-5-ethyl sulphone and 1-phenyl-3-methyl-5-pyrazolone are used.

EXAMPLE 4

21.4 parts of the sodium salt of the dyestuff obtained according to Example 1 from diazoxide of 2-amino-1-hydroxybenzene-5-methyl sulphone and 1-(3'-chlorophenyl)-3-methyl-5-pyrazolone and 23.4 parts of the sodium salt of the dyestuff from diazotised 6-nitro-4-methyl-2-amino-1-hydroxybenzene and 1-(2'-methyl-5-methylsulphonyl phenyl)-3-methyl-5-pyrazolone are pasted in 750 parts of water. 200 parts of a solution of ammonium chromosalicylate (corresponding to 7.6 parts of chromic oxide) are added. The whole is heated under reflux until no more dihydroxyazo dyestuff can be traced and then the chromium containing dyestuff is filtered off. It dyes wool from a neutral to weakly acid bath in red shades which have very good fastness to washing, milling and light.

The dyestuffs shown in the following table are obtained according to the methods more particularly described in the examples.

Table

| No. | Diazoxide | Azo component | Metal | Colour on wool |
|---|---|---|---|---|
| 1 | Cl—CH₂—SO₂—[benzene-oxadiazole] | 1-phenyl-3-methyl-5-pyrazolone | Cr | scarlet. |
| 2 | CH₃—SO₂—[benzene-oxadiazole] | 1-(2'-ethylphenyl)-3-methyl-5-pyrazolone. | Cr | Do. |
| 3 | Cl—CH₂—SO₂—[benzene-oxadiazole] | 1-(4'-methoxyphenyl)-3-methyl-5-pyrazolone. | Cr | Do. |
| 4 | CH₃—CH₂—SO₂—[benzene-oxadiazole] | ----do---- | Cr | Do. |
| 5 | Cl—CH₂—SO₂—[benzene-oxadiazole] | 1-(3'-chlorophenyl)-3-methyl-5-pyrazolone. | Cr | Do. |
| 6 | CH₃—CH—SO₂—[benzene-oxadiazole] | 1-(4'-ethoxyphenyl)-3-methyl-5-pyrazolone. | Cr | Do. |
| 7 | CH₃—CH₂—SO₂—[benzene-oxadiazole] | 1-(3'-methylphenyl)-3-methyl-5-pyrazolone. | Cr | Do. |
| 8 | Id | 1-(4'-nitrophenyl)-3-methyl-5-pyrazolone. | Cr | Do. |
| 9 | CH₃—SO₂—[benzene-oxadiazole] | ----do---- | Cr | Do. |

EXAMPLE 5

1 part of the chromium containing azo dyestuff obtained according to Example 1 paragraph 1 is dissolved in 4000 parts of hot water and 3 parts of ammonium acetate are added. 100 parts of wool are entered at 50°, the bath is brought to the boil within 45 minutes and boiled for a further 30 minutes while moving the goods well. The dyed wool is then rinsed and dried. The dyeing is scarlet red in colour and is fast to light, milling and sea water.

The chromium containing dyestuffs described in the examples and in the table can be dyed on to wool in the same manner.

What we claim is:

1. A complex chromium compound of the general formula

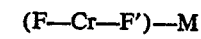

wherein M is a cation selected from the group consisting of sodium and ammonium, F and F' are co-ordinated monoazo dyestuffs of the formula:

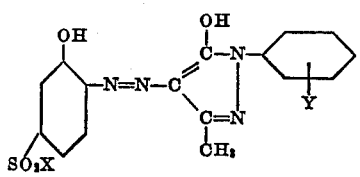

wherein X represents a member selected from the group consisting of $CH_3$—, $C_2H_5$—, and $CH_2Cl$—, Y represents a member selected from the group consisting of hydrogen, chlorine, lower alkyl, lower alkoxy and nitro groups.

2. A complex chromium compound of the formula

wherein M is sodium, and F is a co-ordinated monoazo dyestuff of the formula:

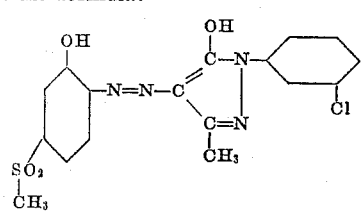

3. A complex chromium compound of the formula

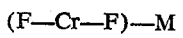

wherein M is sodium and F is a co-ordinated monoazo dyestuff of the formula

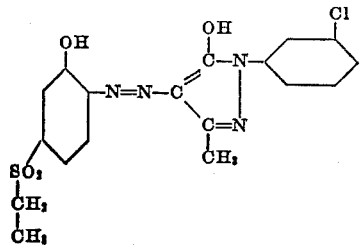

4. A complex chromium compound of the formula

wherein M is sodium and F is a co-ordinated monoazo dyestuff of the formula
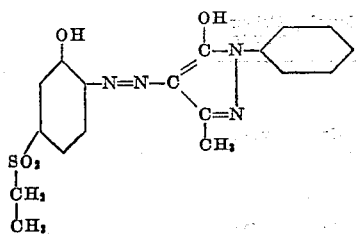
References Cited in the file of this patent
UNITED STATES PATENTS
| | | |
|---|---|---|
| 2,551,056 | Schetty | May 1, 1951 |
| 2,711,404 | Schetty | June 21, 1955 |
| 2,738,345 | Schetty | Mar. 13, 1956 |